No. 739,249. PATENTED SEPT. 15, 1903.
W. H. WOODS.
SCREEN FOR CATCH BASINS OR THE LIKE.
APPLICATION FILED SEPT. 8, 1902.
NO MODEL.

Witnesses:
Fred S. Greenleaf
J. William Lutton

Inventor.
William H. Woods,
By Crosby & Gregory
Attys.

THE NORRIS PETERS CO., PHOTO-LITHO., WASHINGTON, D. C.

No. 739,249. Patented September 15, 1903.

UNITED STATES PATENT OFFICE.

WILLIAM H. WOODS, OF BOSTON, MASSACHUSETTS.

SCREEN FOR CATCH-BASINS OR THE LIKE.

SPECIFICATION forming part of Letters Patent No. 739,249, dated September 15, 1903.

Application filed September 8, 1902. Serial No. 122,463. (No model.)

*To all whom it may concern:*

Be it known that I, WILLIAM H. WOODS, a citizen of the United States, residing at Boston, county of Suffolk, State of Massachusetts, have invented an Improvement in Screens for Catch-Basins or the Like, of which the following description, in connection with the accompanying drawings, is a specification, like letters on the drawings representing like parts.

This invention has for its object the production of a simple and effective screen for catch-basins and the like to prevent the passage of sticks, solid refuse matter, or other material into the body of the basin, the construction of the screen being such that it may be applied with equal readiness to existing catch-basins as well as to new ones.

It is well known that catch-basins become filled up and their outlet-pipes clogged with all kinds of refuse, and as the outlet-pipe is usually provided with a valve opening outward it will be manifest that should solid matter become wedged in the valve-opening the valve cannot close and sewer-gas can enter the basin and be discharged therefrom into the vicinity. Catch-basins are frequently made with a contracted clean-out opening or manhole, and the outlet is located in the side of the basin nearer its top, so that some water and sediment can collect in the bottom of the basin to be removed from time to time. When refuse vegetable or animal matter and other solid objects are permitted to pass into the basin, the latter is soon filled and cannot perform its proper office.

In my present invention I have devised a screen of peculiar construction and adapted to be supported in the basin above its outlet and a short distance below its top, the screen permitting the free passage of liquid matter, but effectually preventing any solid matter in bulk from entering the lower part of the basin. The screen is made collapsible or foldable, so that it can be inserted or removed through the manhole, and it is also provided with a detachable section which can be temporarily removed when it is desired to have access to the lower part of the basin.

The various novel features of my invention will be hereinafter described, and particularly pointed out in the following claims.

Figure 1:
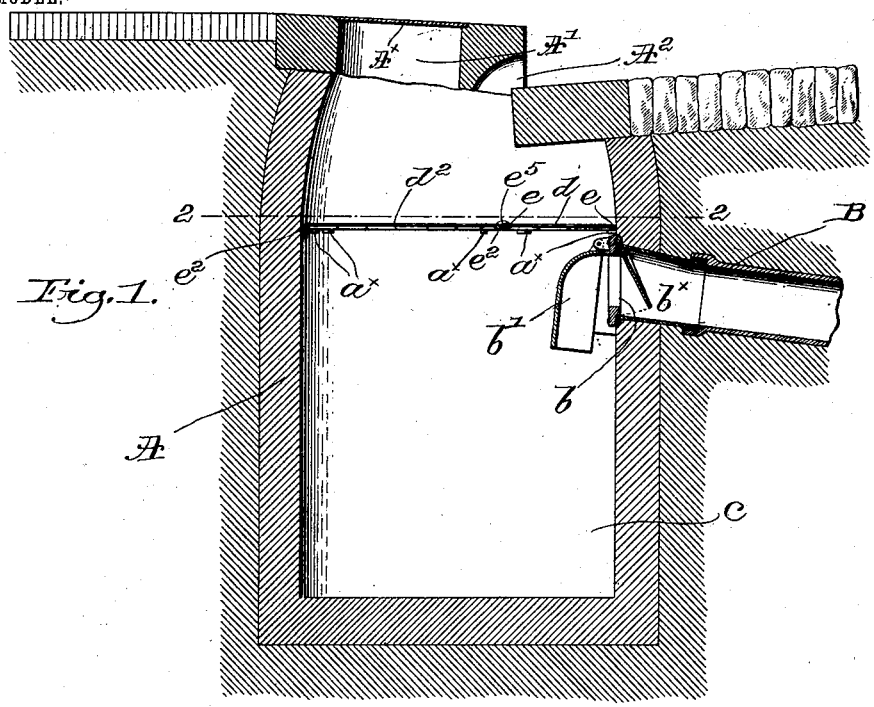
Figure 2:
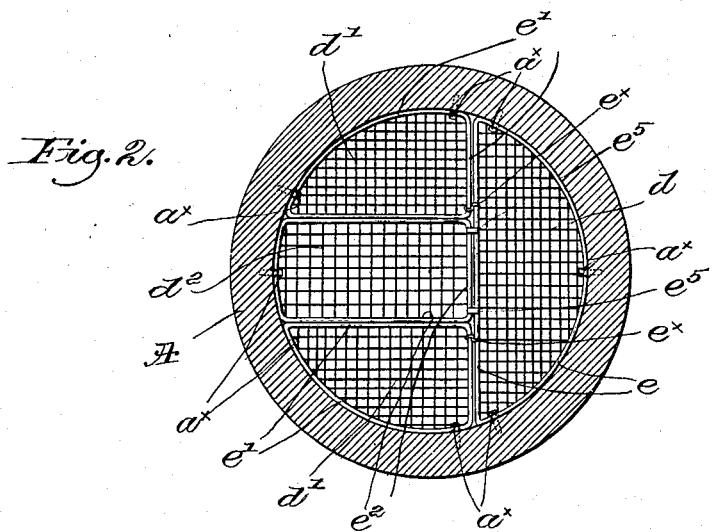

Figure 1 is a vertical central section of a catch-basin provided with a screen embodying one form of my invention; and Fig. 2 is a horizontal section on the line 2 2, Fig. 1, the outlet-pipe of the catch-basin being omitted.

The catch-basin A (herein shown as circular in cross-section and constructed of brick or other usual material) is provided with a clean-out opening or manhole $A'$, Fig. 1, having a cover $A^\times$, the inlet $A^2$ communicating with the gutter, all substantially of well-known construction, the sewer outlet-pipe B having a vertical valve-seat $b$ and a swing-valve $b^\times$, opening outward. The outlet is shown in Fig. 1 as provided with a down-turned trap $b'$; but the particular construction thereof or of the outlet-valve is of no particular importance so far as my present invention is concerned.

As best shown in Fig. 2, the screen comprises a plurality of sections or parts, and I have shown a circular screen adapted to conform to the internal shape of the catch-basin. In constructing the screen I make a main section $d$ of reticulated material, such as strong wire-netting of suitable mesh, secured to a sector-shaped rim $e$, of heavy iron wire or rod-like material. Two smaller and like sections $d'$ $d'$, also of reticulated material, are secured to rims $e'$ $e'$, the said rims having two straight sides at right angles and a third curved side, as clearly shown in Fig. 2. The sections $d'$ are located symmetrically with relation to the section $d$, so that a space is left between them, the shorter straight side of each rim $e'$ being connected by a clip $e^\times$ with the long straight side of the rim $e$, so that the sections $d'$ can be swung relatively to the section $d$. To complete the screen, I provide a removable section $d^2$, of reticulated material, secured to a rim or frame $e^2$, shaped to enter the space between the sections $d'$, the outer end of the rim $e^2$ being curved and forming an arc of the circular periphery of the complete screen. Hook-like ears $e^5$ are secured to the end of the rim $e^2$ which is opposite the curved end, said ears hooking over the long straight side of the rim $e$.

In order to support the screen in the basin, I have shown a number of pins or lugs $a^\times$ inserted in the side walls of the basin above the outlet and projecting inward a short distance beyond the walls. These supports may be made in any suitable manner, and they project far enough to engage the curved parts of the rims of the several sections of the screen, holding the latter flat and in operative position. By an inspection of Fig. 2 it will be seen that the sections $d$ and $d'$ are firmly and securely held in place by the lugs and that the detachable section $d^2$ is held in position by one of the lugs at the outer end of the rim $e^2$ and by the ears $e^5$ engaging the rim $e$.

Any solid matter in bulk is stopped by the screen and held upon it, so that nothing which could choke or clog the outlet-valve can pass into the outlet, the material caught by the screen being kept near the top of the catch-basin, so that it can be readily removed.

If it is neccessary to get at the basin below the screen, the section $d^2$ is removed and lifted out without disturbing the remainder of the screen.

To insert the screen in a catch-basin, the section $d^2$ is removed and the sections $d'$ swung around upon the section $d$, so that they may be readily passed through the opening $A'$, and after the screen is in the basin it is opened out and the section $d^2$ put in its place.

I prefer to make the reticulated material and the rim portions of galvanized iron wire, so as to prevent rust or corrosion. The size of the mesh and the diameter of the screen-wire will depend upon the size and character of the basin.

My invention is not restricted to the precise construction and arrangement herein shown, as the same may be modified or rearranged in various particulars without departing from the spirit and scope of my invention.

Having described my invention, what I claim as new, and desire to secure by Letters Patent, is—

1. A catch-basin having a side outlet and a permanent top provided with a contracted clean-out opening, a collapsible screen insertible into the basin through said opening when collapsed, said screen having a section detachably connected with the other part thereof and removable through the clean-out opening, and screen-supporting means projecting inward from the walls of the catch-basin near the top thereof and between it and the side outlet.

2. A catch-basin, and a screen supported therein below, but near the top of the catch-basin, said screen comprising a plurality of collapsibly-connected parts or sections and a section which is detachably connected with the other and collapsible part of the screen.

3. A collapsible screen for catch-basins and the like, comprising a plurality of sections collapsibly connected, and a detachable section to complete the screen-surface.

4. A collapsible screen for catch-basins and the like, comprising a reticulated sector-shaped section, two like, reticulated sections pivotally connected with the straight side of the sector-shaped section, and a detachable section also reticulated and adapted to fit between the two like sections and provided with means to connect it with the sector-shaped section, the several sections when opened and in condition for use presenting a circular, substantially flat reticulated screen.

In testimony whereof I have signed my name to this specification in the presence of two subscribing witnesses.

WILLIAM H. WOODS.

Witnesses:
JOHN C. EDWARDS,
EDITH M. STODDARD.